June 6, 1961  E. W. SWENSON  2,986,977
ROLLER ATTACHMENT FOR AUTOMOTIVE VEHICLES
Filed Oct. 26, 1953  3 Sheets-Sheet 2
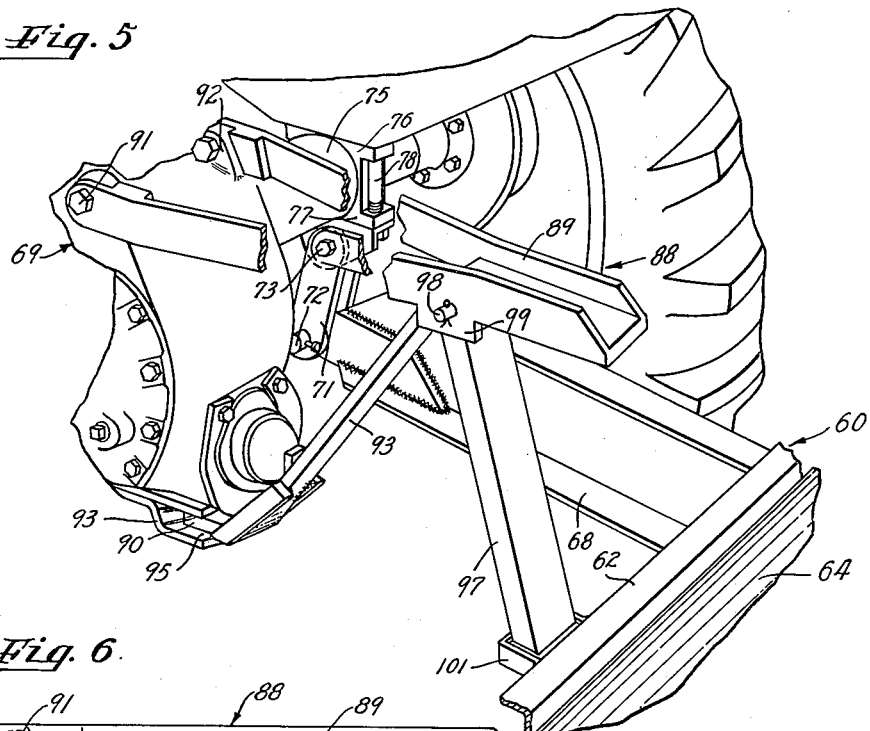
Fig. 5
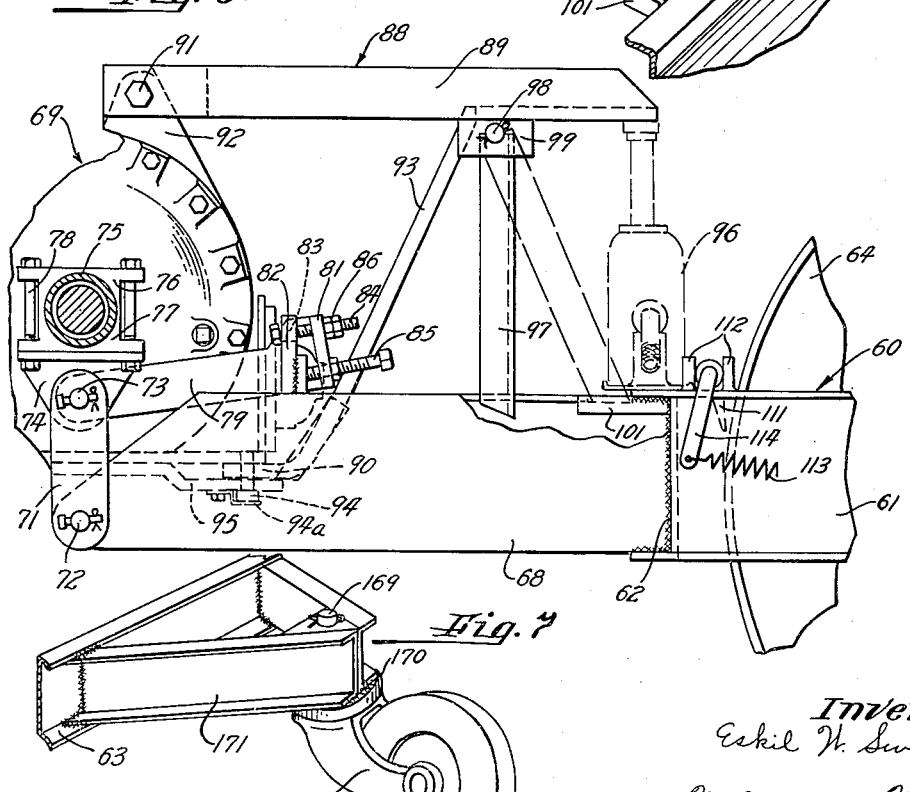
Fig. 6.
Fig. 7
Inventor
Eskil W. Swenson
By McCanna and Morsbach
Attys.

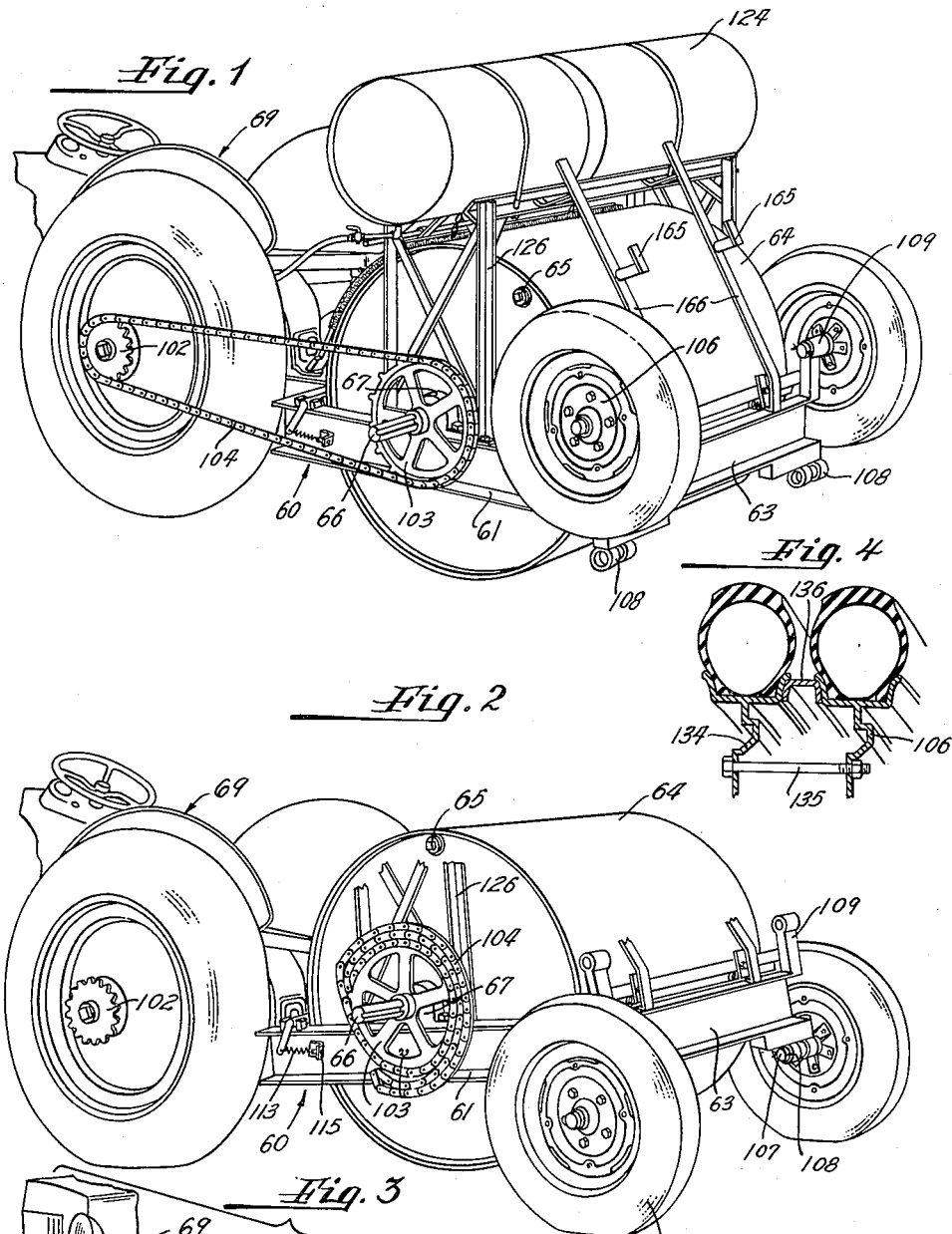

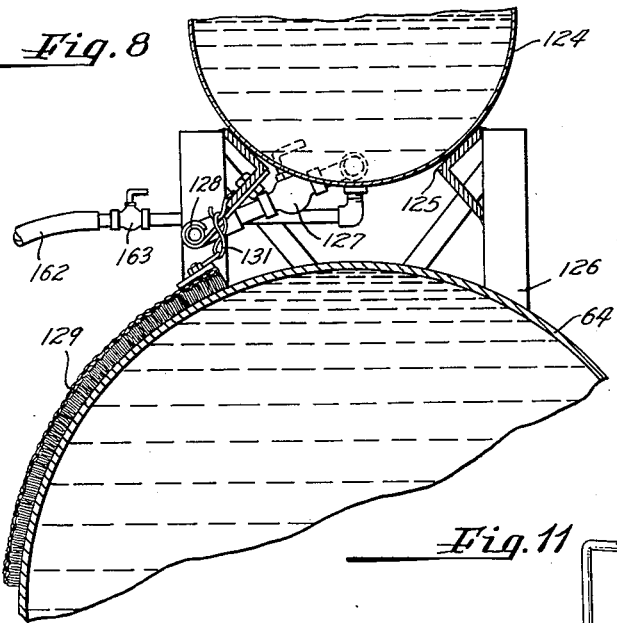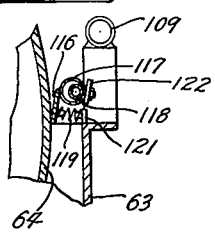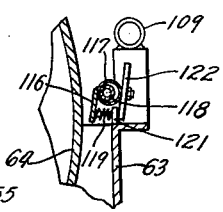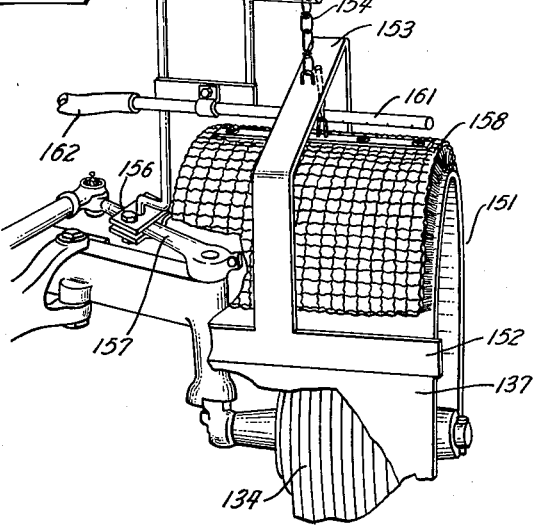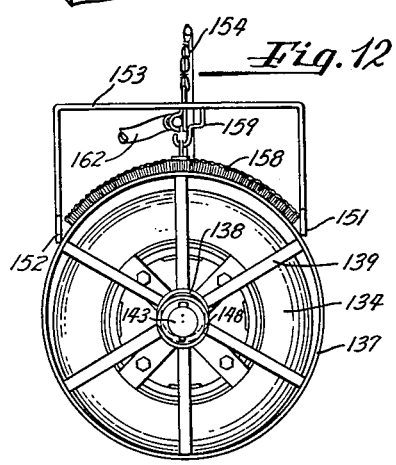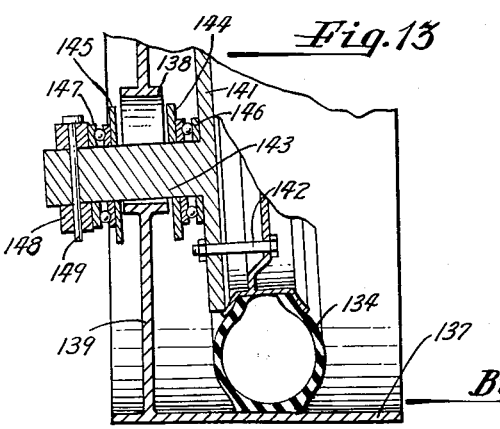

United States Patent Office 2,986,977
Patented June 6, 1961

2,986,977
ROLLER ATTACHMENT FOR AUTOMOTIVE VEHICLES
Eskil W. Swenson, Cherry Valley, Ill.
Filed Oct. 26, 1953, Ser. No. 388,090
7 Claims. (Cl. 94—50)

This invention relates to a roller attachment intended for use as a road roller or other ground compacting operations.

In the construction and repair of pavements, runways and the like, heavy rollers are required for the purpose of compacting and smoothing the surfaces. At present, the rollers are specially designed vehicles useful only for rolling operations. These rollers are of heavy construction to provide sufficient weight for their intended use and normally include a prime mover for propulsion so that the original cost of such rollers is high. Further, the construction of these rollers is such that they can move only at a very slow rate which, while satisfactory for rolling operations, is very time consuming when moving the roller to and from remote jobs. To alleviate this difficulty, it is common practice to provide a specially constructed trailer and a tow vehicle therefor to haul the roller to and from its point of use. This additional equipment further increases the investment and the operating expenses of the roller and renders purchasing of such equipment prohibitive where the use of the roller is not extensive.

The present invention avoids these disadvantages by adapting a conventional vehicle such as a tractor or truck for use as a roller in a manner enabling the weight of the vehicle to be imposed on the surface rolling drum to thereby increase the effective weight thereof. The drum is mounted on the vehicle so as to be readily adjustable between an operative position in engagement with the ground and an elevated position above the ground whereby the vehicle and the drum carried thereby may be rapidly transported to its place of use and then converted into a roller.

It is, therefore, an object of this invention to provide a novel and improved ground-compacting roller attachment.

It is also an object of this invention to provide a novel roller attachment of relatively small size and weight adapted to be attached to a vehicle for the application of the weight of the vehicle down onto the roller.

Another object of this invention is to provide a road roller attachment adapted to be transported by a vehicle to its point of use and then readily converted to use as a road roller without being dismounted from that vehicle, and in such a manner that the weight of the vehicle is applied to the roller.

A further object of this invention is to provide a novel combination of a vehicle and road roller attachment adapted to be connected to the vehicle, to support the weight of the vehicle and to be driven from the drive to the rear wheels of the vehicle.

Yet another object of this invention is to provide a roller attachment for a vehicle which is adapted to be mounted on the rear of the vehicle in such a manner that the rear portion of the vehicle is supported on the roller with the rear wheels of the vehicle spaced above the surface being rolled and the front portion of the vehicle supported on the front wheels thereof whereby the roller may be guided.

Still another object of this invention is the provision of a novel combination of a vehicle and roller attachment which is adapted to be mounted on the rear of the vehicle so that the weight of the vehicle is supported on the roller and the front wheels of the vehicle, with apparatus for increasing the effective tread width of the front wheels without impairing operation of the front wheels for guiding the vehicle.

Still a further object of this invention is to provide an improved means for preventing material from adhering to the front wheel roller attachment and which means turns with the wheel when the latter is operated to guide the vehicle.

An additional object of this invention is to provide a roller attachment for a vehicle which is mounted on the vehicle in such a manner that the latter can be maneuvered with equal facility in forward and reverse to thereby permit successive rolling operations over the same surface without having to turn the vehicle.

Other objects and many of the attendant advantages of this invention will be more readily appreciated, as the same becomes better understood by reference to the following detailed description when taken in consideration with the accompanying drawings wherein:

FIG. 1 is a perspective view showing a modified form of roller attachment mounted on a tractor, with the roller in its operative position against the ground;

FIG. 2 is a perspective view of the roller attachment shown in FIG. 1 with the roller in its retracted rapid transport position;

FIG. 3 is a fragmentary perspective view showing one form of apparatus for increasing the effective tread width of the front wheels of the vehicle to thereby adapt the vehicle at the forward end thereof for use as a roller;

FIG. 4 is a fragmentary sectional view through the front wheel of the vehicle showing the manner of attaching an auxiliary wheel thereto to increase the tread width of the front wheels;

FIG. 5 is a fragmentary perspective view of the roller attachment of FIG. 1 showing the structure by which the roller is attached to the tractor;

FIG. 6 is a side elevational view of the roller supporting means on a vertical longitudinal plane just inside the tractor wheel;

FIG. 7 is a perspective view of a modified form of support wheel for use when the roller is in its retracted position;

FIG. 8 is a fragmentary vertical sectional view through the roller attachment of FIG. 1;

FIG. 9 is a fragmentary sectional view of the roller attachment of FIG. 1 showing the roller scraper in its operative position;

FIG. 10 is a fragmentary sectional view of the roller attachment of FIG. 1 showing the roller scraper in its retracted or transport position;

FIG. 11 is a fragmentary perspective view showing a modified form of apparatus for increasing the effective tread width of the front wheels of the tractor to adapt the tractor for use as a road roller;

FIG. 12 is a side elevational view of the front wheel of the vehicle having the apparatus shown in FIG. 11 applied thereto; and FIG. 13 is a fragmentary sectional view through the front wheel showing details of construction of the mounting of the apparatus shown in FIG. 11 on the front wheel of the tractor.

The form of the apparatus for converting a vehicle into a road roller, illustrated in FIGS. 1–13 is shown applied to a tractor and includes an attachment frame 60 having spaced side members 61 and forward and rear cross pieces 62 and 63 respectively. A cylindrical drum 64 which may be of any desired construction, either solid or hollow is provided with an axle 66 projecting on opposite ends thereof, which axle is rotatably journaled in bearings 67 carried on the side members 61 of the frame. As illustrated, the drum 64 is hollow and so provided with a removable closure plug 65 whereby the drum may be filled with water or the like to provide the desired weight. Alternatively, any other suitable material such as concrete which will solidify in the drum may be used, if desired. A pair of spaced parallel beams 68 are secured intermediate the ends of the front cross piece 62 and project forwardly therefrom to be attached at the forward end thereof to the vehicle 69 such as a tractor.

The attachment frame 60 is mounted on the vehicle for vertical pivotal movement, and is preferably adjustable longitudinally thereof to permit tightening of the roller drive chain, to be described more fully hereinafter. For this purpose there is provided links 71 which are pivotally connected to the forward ends of the beams 68 by pins 72, the other ends of the links being pivotally connected, as by pins 73 to ears 74 which are secured to the rear axle housing 75 of the vehicle 69. The ears 74 may be secured to the housing, in any desired manner, as by having the flanges thereon secured to the clamp blocks 76 and 77 which are immovably clamped to the rear axle housing 75 by bolts 78, and which blocks may conveniently comprise the means provided on the tractor for supporting the rear wheel guards.

In order to permit adjustment of the attachment frame 60 longitudinally of the vehicle, while permitting relative pivotal movement thereof into and out of its operactive position, there is provided a bar 79 which is pivotally connected at one end by a pin 73 to the ear 74 and, at the other end is provided with a transverse flange 81. A lug 82 is rigidly secured as by welding to each of the beams 68, and is provided with an opening 83 for loosely receiving a bolt 84, the threaded end of which bolt slidably extends through the flange 81 on the bar 79. A bolt 85 is threadedly received in the flange 81 and abuts the lug 82 to adjustably control the spacing between the flange and lug. Adjustment of the frame, to tension the drive chain is effected by adjusting bolt 85 in a direction to retract the bolt away from the lug and thereafter tightening the nuts 86 on the bolt 84 to draw the lug towards the flange and thereby shift the attachment frame rearwardly relative to the bar 79. The bolt 85 is then adjusted to engage the lug and is locked in adjusted position by a lock nut thereon to thereby prevent further relative movement between the link 79 and the beam 68. When thus adjusted, the frame 60 is adapted for pivotal movement relative to the vehicle 69 about the pin 73 and the link 71 and bar 79 move in unison with the frame.

The frame 60 is adapted to be maintained in a predetermined pivotally adjusted position relative to the tractor in which the weight of the tractor is supported at the rear thereof on the drum 64 and for this purpose there is provided a brace bracket assembly 88 including an upper Y-shaped support member 89, the bifurcated ends of which are secured, as by bolts 91 to flanges 92 carried on the housing 75. The other end of the Y-shaped member has a brace arm 93 rigidly secured thereto, and extending downwardly and forwardly adjacent the lower side of the differential housing. The lower end of the brace arm 93 is adapted for attachment to the conventional implement hitch provided on the tractor and for this purpose is provided with an angulated end portion 90 which extends between the hitch plate 95 and the underside of the housing where the implement draw bar normally extends. A pin 94 extends through aligned apertures in the hitch plate and end portion 90, the pin being retained in position by a keeper 94a commonly provided on the hitch plate to retain the hitch pin 94 in position. The brace bracket assembly is thus rigidly but detachably secured to the vehicle 69, and the free end of the member 89 is preferably constructed so as to overlie the front cross piece 62 whereby a jack 96 may be positioned therebetween to positively force the attachment frame downwardly and thereby support the weight of the rear portion of the vehicle on the drum 64. When the frame has been moved to a predetermined position, an arm 97 which is pivotally connected at its upper end by the pin 98 to the depending ears 99 on the support member 89 is adapted to be moved from the solid line position shown in FIG. 6 into the dotted line position and be seated into the recessed plate 101 secured to the front cross piece 62. The jack 96 is then removed whereby the brace arm supports the attachment frame in proper position relative to the support member 89.

When the drum is in its operative position, the base arm 97 is in the dotted position shown in FIG. 6 and supports the weight of the rear portion of the vehicle on the drum. The roller and the vehicle are adapted to be driven by means of the sprockets 102 and 103 secured to the rear axle of the vehicle and to the projecting ends of the axle 66 respectively, which sprockets are interconnected by a chain 104. The chain is adapted to be tightened in the manner hereinbefore described by means of the bolts 84 and 85, which serve to adjustably shift the attachment frame longitudinally of the vehicle. As will be noted, the base arm 97 is pivotally supported on the brace bracket assembly 88 and will pivot slightly relative to this bracket and to the recessed plate 101 as the frame is adjusted longitudinally of the vehicle. When the roller is in its retracted or transport position, the chain 104 may be removed from the drive sprockets 102 on the rear axle of the tractor, wound around the sprockets 103 and detachably secured in position thereon as shown in FIG. 2.

When the roller is in its transport position, the latter is supported by means of wheels 106 which are mounted on stub shafts 107, and which stub shafts are adapted to be interchangeably positioned into either the lower set of journals 108 carried on the rear cross piece 63, when the roller is in its transport position, or positioned in the upper set of journals 109 when the roller is in its operative position. In order to mount the wheels 106 in the lower journals 108, the frame 60 and roller 64 are raised, as by the aforedescribed jack 96 positioned between the frame and the ground.

Provision is made for cleaning the surface of the roller 64, and includes a front scraper blade 111 pivotally mounted between spaced lugs 112 on the side pieces 61 adjacent the forward end of the roller, which scraper blade is yieldably urged into engagement with the roller by means of a contractile spring 113 secured to an arm 114 carried by the blade, and which spring is otherwise secured to a bracket 115, as shown in FIG. 2. A rear scraper blade 116 is provided adjacent the rear side of the roller, and is secured to a tubular member 117 which loosely receives a pipe 118 therein, and which pipe is rigidly secured to the support brackets for the upper set of journals 109. The blade 116 is yieldably urged into engagement with the roller 64 by a compression spring 119 disposed between a lug 121 on the rear cross piece 63 and the blade 116 and guided by suitable pins which extend into the spring. Thus, the scraper blade 116 is mounted for pivotal and lateral movement on the pipe 118 to accommodate for any eccentricity of the drum which may be present whereby the scraper blade may follow the contour of the drum and assure uniform scraping action. The scraper blade is adapted to be locked in a retracted position by means of a pivotally mounted finger 122 which is attached to the tubular member 117 and which is pivotal from the position shown in FIG. 9, into the position shown in FIG. 10 wherein it engages the lug 121 and retains the blade in its retracted position.

In the rolling of certain surfaces such as tarred and macadam roads, it is desirable to wet the surface of the roller. There is accordingly provided a pair of water storage tanks 124 which are supported on transverse angle irons 125 secured to the upper ends of the posts 126 carried by the attachment frame. The storage tanks are preferably positioned so as to overlie the roller and thereby apply the weight thereof down onto the roller, and water from the outlet adjacent the bottom thereof is passed through a valve 127 to a perforate line 128 which extends across the upper surface of the roller. The latter is adapted to supply water or other liquid onto a mat 129 which contacts the surface of the roller, and which is attached as by the links 131 to the transverse angle irons 125 at spaced points therealong.

When the roller is in its operative position, the rear wheels of the vehicle are elevated above the surface being rolled and the weight of the vehicle is supported at the rear by the roller, and at the front by the front wheels of the vehicle. Provision is made for increasing the tread width of the front wheels and for this purpose, the auxiliary wheels 106 which are provided to support the roller when the latter is in its retracted position may be chosen so as to have the same outer diameter as the front wheels 134 of the vehicle, and the auxiliary wheels mounted on the front wheels so as to form a dual tire assembly. As shown in FIGS. 3 and 4, this is achieved by bolting the auxiliary wheels 106 to the front wheels 134, by bolts 135 and providing an annular spacing ring 136 which is adapted to engage the adjacent rims of the respective wheels and maintain the latter in axial spaced relation. Alternatively, separate wheels may be provided for use on the front wheels of the vehicle to increase the tread width thereof.

A modified form of apparatus for increasing the tread width of the front wheels is shown in FIGS. 11–13 and comprises cylindrical rims 137 which are adapted to be mounted on the front wheels 134 and extend about the periphery thereof, the rims being provided with an enlarged hub 138 which is secured thereto as by spokes 139. The rim is attached to the front wheel, for turning movement therewith, by means of an adapter plate 141 bolted to the wheel by bolts 142 and provided with an axially extending stub shaft 143. The hub 138 is loosely mounted between plates 144 and 145 for limited radial movement relative to the stub shaft 143, which plates are rotatably mounted on the stub shaft between anti-friction bearings 146 and 147. The entire assembly is maintained on the stub shaft by a collar 148 and a pin 149. In order to prevent the rims 137 from riding along the outer edge thereof, due to the vertical inclination or camber of the front wheels, the rims 137 are loosely disposed around the periphery of the tires on the front wheels and the hub 138 is loosely received between plates 144 and 145 for limited radial movement and angular shifting about an axis transverse the stub shafts 143. Thus, the weight of the front portion of the vehicle is applied to the rims 137 by contact of the front tires with the inner periphery of the rims, the plates 144 and 145 serving to retain the rim in position on the front wheel while permitting limited relative movement therebetween. The rim therefore follows the contour of the surface being rolled and the front wheel rotates within the rim in a plane inclined to the vertical as determined by the front wheel camber. As the front wheels are turned during steering of the vehicle, the vertical inclination of the front wheels varies from that when the front wheels are positioned to guide the vehicle in a straight path. However, by reason of the aforementioned mounting of the rims on the wheels, the rims continue to follow the contour of the surface being rolled. Thus, the rims do not ride along one edge thereof and form grooves in the surface being rolled.

Cleaning of the roller rims is effected by forward and rear scrapers 151 and 152 which are attached to the ends of a U-shaped member 153. The U-shaped member is suspended by means of a chain 154 from the free end of an L-shaped support arm 155, which support arm is otherwise secured as by a clamp assembly 156 to the steering arms 157 of the vehicle whereby the support arm moves therewith during turning movement of the front wheels to thereby maintain the scrapers in position on the rims 137. A mat 158 is loosely supported on a hook 159 carried by the U-shaped member, and a perforate spray pipe 161 is attached to the support arm 155 for movement therewith, which spray pipe is adapted to spray liquid onto the mat to thereby wet the surface of the rim 137. Conveniently, fluid may be supplied to the spray pipes 161 through a flexible conduit or hose 162 from the storage tanks 124 carried by the attachment frame, a suitable valve 163 being provided to regulate the flow of water to the spray pipes.

When the vehicle is not in use as a road roller, the rims 137 may be positioned on the hooks 165 supported on the members 166 attached to the rear of the attachment frame.

When the device is used under adverse conditions in which the surface being rolled is soft and the front wheels of the vehicle tend to form depressions therein, the tread width of the front wheels should be increased by suitable apparatus to more evenly distribute the weight of the front of the vehicle. This may be achieved by mounting an auxiliary wheel on the front vehicle wheels as shown in FIGS. 3 and 4 or by providing apparatus as shown in FIGS. 11–13 wherein a cylindrical rim is mounted on the front wheels for turning movement therewith. The latter apparatus is particularly adapted for use when rolling bituminous and macadam roads since such materials do not readily adhere to the surface of the metal rims whereas they do tend to adhere to the tires of the vehicle.

FIG. 7 illustrates a modified form of support wheel for supporting the roller attachment when the latter is in its transport position, and which support wheel comprises a caster 168 swivelly mounted as by the pin 169 journaled on the rearwardly projecting members 171 secured to the cross member 63. A thrust plate 170 is secured to the underside of the members and engages the caster, as is conventional. Since the caster 168 can swivel about the axis of the pin 169, turning of the vehicle is facilitated when the roller attachment is in its transport position. Whereas one caster is illustrated, one or more wheels may be provided as is deemed necessary to support the weight of the roller attachment in its transport position.

From the foregoing, it will be readily apparent that a conventional vehicle such as a tractor is adapted for use as a roller by an attachment which is itself lighter in weight than other self-propelled rollers, yet is fully effective for its intended purpose because of the novel manner in which it enables the weight of the vehicle to be applied onto the drum to thereby increase the effective weight thereof. The attachment when mounted on the vehicle is driven from the drive to the rear wheels of the vehicle so that no separate means of propulsion need be provided and the entire attachment is readily removable from the vehicle so that the latter may be used alone for its intended functions. Thus, the investment in equipment is minimized without impairing the effectiveness of the roller for surface smoothing and compacting operations.

The roller attachment is adapted for mounting on any conventional vehicle and adjusted to either an operative ground engaging position or in a retracted transport position without the necessity of disconnecting the roller attachment from the vehicle and requiring only a minimum of effort in being adjusted between its operative position and its transport position. In the latter position, the vehicle and the roller attachment may be rapidly moved to and from the point of use of the roller by the vehicle itself and without requiring a special trailer and tow vehicle therefor as is necessary with other self-propelled rollers. Further, the roller attachment is adapted for compacting and smoothing different surfaces. The surface compacting pressure applied by the roller to the surface being rolled is controllable, within wide limits, by the amount of liquid in the drum. The tread width of the front wheels of the vehicle may be increased in accordance with the type of surface being rolled to prevent grooving soft surfaces and, by using the rims shown in FIGS. 11–13, bituminous and macadam surfaces, which tend to adhere to tires, may be efficiently rolled.

Whereas the attachment of the type illustrated is shown applied to a tractor, it is apparent that attachments of these general forms may be attached to vehicles other than the types specifically described in connection therewith and that the auxiliary roller attachments for the front wheels of the vehicle shown in connection with the tractor, may be advantageously applied to a truck or other vehicle.

I claim:

1. In combination with a vehicle including a vehicle body having front steering wheels and rear drive wheels, a motor, and a differential drive means connecting said rear wheels to said motor, a roller attachment frame including a pair of forwardly projecting frame members, a drum rotatably mounted on said frame adjacent the rear end thereof, a link pivotally attached to each of said frame members at a point forwardly of said drum, for movement about an axis parallel to the axis of the drum, means pivotally attaching the other ends of said links to said vehicle body for movement about an axis parallel to said drum to attach the frame to the vehicle for swinging movement and limited longitudinal shifting movement relative to the vehicle, means including a pair of chains drivingly connecting said rear wheels to opposite ends of said drum, a pair of frame adjusting arms each pivotally attached to said body for movement relative thereto about the pivot axis of said links, means adjustably connecting each arm with a respective one of said frame members for adjusting said frame members longitudinally of said vehicle to tension said chains and maintain the drum in spaced relation to the rear vehicle wheels during the rolling operation, and means for selectively securing said frame to said vehicle in a preselected vertically adjusted position relative to the vehicle in which the drum is in engagement with the ground and the rear wheels of the vehicle are spaced above the ground whereby the weight of the rear portion of the vehicle is supported on the drum.

2. In combination with a vehicle including a vehicle body having front steering wheels and rear drive wheels, a motor, and a differential drive means connecting said rear wheels to said motor, a roller attachment frame including a pair of forwardly projecting frame members, a drum rotatably mounted on said frame adjacent the rear end thereof, a link pivotally attached to each of said frame members at a point forwardly of said drum, for movement about an axis parallel to the axis of the drum, means pivotally attaching the other ends of said links to said vehicle body for movement about an axis parallel to said drum to attach the frame to the vehicle for swinging movement and limited longitudinal shifting movement relative to the vehicle, means including a pair of chains for drivingly connecting said rear wheels to opposite ends of said drum, means for adjusting said frame longitudinally relative to the vehicle to adjust the tension in said chains, said adjusting means comprising a pair of arms each pivotally attached to said body for movement relative thereto about the pivot axis of said links, a lug on each of said frame members, means on each arm engageable with a respective lug for adjusting said frame members longitudinally of said vehicle to adjust the tension in said chains, and means for selectively securing said frame to said vehicle in a preselected adjusted position relative to the vehicle in which the drum is in engagement with the ground and the rear wheels of the vehicle are spaced above the ground whereby the weight of the rear portion of the vehicle is supported on the drum.

3. In combination with a vehicle including a vehicle body having front steering wheels and rear drive wheels, a motor, and a differential drive means connecting said rear wheels to said motor, a roller attachment frame including a pair of forwardly projecting frame members, a drum rotatably mounted on said frame adjacent the rear end thereof, a link pivotally attached to each of said frame members at a point forwardly of said drum, for movement about an axis parallel to the axis of the drum, means pivotally attaching the other ends of said links to said vehicle body for movement about an axis parallel to said drum to attach the frame to the vehicle for swinging movement and limited longitudinal shifting movement relative to the vehicle, means including a pair of chains for drivingly connecting said rear wheels to opposite ends of said drum, means for adjusting said frame longitudinally relative to the vehicle to adjust the tension in said chains, said adjusting means comprising a pair of arms each pivotally attached to said body for movement about the axis of said links, a lug on each of said frame members, stop means on said arm engageable with said lug for limiting rearward movement of said frame members relative to said body, and a brace arm attached to said body and extending downwardly and rearwardly therefrom into engagement with said frame to secure said frame to the vehicle in a position in which the drum is in engagement with the ground and the rear wheels of the vehicle are spaced above the ground whereby the weight of the rear portion of the vehicle is supported on said drum.

4. In combination with a vehicle having a pair of front steering wheels and a pair of rear drive wheels, a motor, and a drive means connecting said rear wheels to said motor, a frame mounted on said vehicle for movement between an elevated position and a lowered position, a cylindrical drum means journaled on said frame and extending crosswise of said vehicle, means for selectively moving said frame relative to said vehicle to its lowered position in which the drum means engages the ground and the rear wheels of the vehicle are spaced above the ground to support the weight of the vehicle at the rear on said drum means and at the front on said steering wheels, means including said motor for rotating said drum means to drive the vehicle, a rim disposed around each of the front steering wheels for supporting the vehicle at the front thereof, said rims having an inner diameter appreciably greater than the outer diameter of the steering wheels so that the steering wheels contact the respective rim only at the bottom thereof, and means attaching said rims to said steering wheels for limited radial shifting and tilting movement therebetween, said attaching means including an axle extending outwardly from each steering wheel, a hub on each rim having a diameter sufficiently larger than said axle to accommodate the radial shifting of the steering wheels within said rims as the wheels roll therein, and means on said axle spaced from the ends of said hub and engageable therewith for limiting axial movement of the rim relative to the steering wheels while permitting limited turning and tilting of the wheels within the rims whereby the rims will conform to the contour of the ground, said last mentioned means including a pair of plates mounted on each of said axles on opposite sides of the hub and spaced apart a distance greater than the length of said hub.

5. In combination with a vehicle having a pair of front steering wheels and a pair of rear drive wheels, a motor, and a drive means connecting said rear wheels to said motor, a frame mounted on said vehicle for movement between an elevated position and a lowered position, a cylindrical drum means journaled on said frame and extending crosswise of said vehicle, means for selectively moving said frame relative to said vehicle to its lowered position in which the drum means engages the ground and the rear wheels of the vehicle are spaced above the ground to support the weight of the vehicle at the rear on said drum means and at the front on said steering wheels, means including said motor for rotating said drum means to drive the vehicle, a rim disposed around each of the front steering wheels for supporting the vehicle at the front thereof, said rims having an inner diameter appreciably greater than the outer diameter of the steering wheels so that the steering wheels contact the respective rim only at the bottom thereof, and means attaching said rims to said steering wheels for limited radial shifting and tilting movement therebetween, said attaching means including an axle extending outwardly from each steering wheel, a hub on each rim having a diameter sufficiently larger than said axle to accommodate the radial shifting of the steering wheels within said rims as the wheels roll therein, and means on said axle spaced from the ends of said hub and engageable therewith for limiting axial movement of the rim relative to the steering wheels while permitting limited turning and tilting of the wheels within the rims whereby the rims will conform to the contour of the ground, said last mentioned means including a pair of plates rotatably received on each of said axles on opposite sides of the hub, and means including thrust bearings engaging the sides of said plates opposite the hub for rotatably supporting the plates on the axle and for maintaining the plates spaced apart a distance greater than the length of the hub.

6. The combination of claim 5 including a pair of scraper blades engaging each of said rims at circumferentially spaced points, a bracket connected to each of said pairs of blades to maintain the same in spaced relation to each other, and means including a flexible connector suspending said brackets on the vehicle above said steering wheels to support said blades for tilting and turning with said rims.

7. In combination with a vehicle having a pair of front steering wheels and a pair of rear drive wheels, a motor, and a drive means connecting said rear wheels to said motor, a frame mounted on said vehicle for movement between an elevated position and a lowered position, a cylindrical drum means journaled on said frame and extending crosswise of said vehicle, means for selectively moving said frame relative to said vehicle to its lowered position in which the drum means engages the ground and the rear wheels on the vehicle are spaced above the ground to support the weight of the vehicle at the rear on said drum means and at the front on said steering wheels, means including said motor for rotating said drum means to drive the vehicle, a rim disposed around each of the front steering wheels for supporting the vehicle at the front thereof, said rims having an inner diameter appreciably greater than the outer diameter of the steering wheels so that the steering wheels contact the respective rim only at the bottom thereof, and means attaching said rims to said steering wheels for limited radial shifting and tilitng movement therebetween, said attaching means including an axle extending outwardly from each steering wheel, a hub on each rim having a diameter sufficiently larger than said axle to accommodate the radial shifting of the steering wheels within said rims as the wheels roll therein, and means on said axle spaced from the ends of said hub and engageable therewith for limiting axial movement of the rim relative to the steering wheels while permiting limited turning and tilting of the wheels within the rims whereby the rims will conform to the contour of the ground, a pair of arms attached to said vehicle for turning movement with one of said front steering wheels and having a portion overlying a respective wheel, a pair of scraper blades each adapted to rest on the periphery of one of said rims, a yoke connecting each pair of blades to maintain the same in spaced relation to each other, and a flexible connector extending between said yoke and the respective arm for suspending said yokes from the arms to support said blades for tilting and turning with said rims.

References Cited in the file of this patent

UNITED STATES PATENTS

| | | |
|---|---|---|
| 572,447 | Puffer | Dec. 1, 1896 |
| 1,375,185 | Seiter | Apr. 19, 1921 |
| 1,419,555 | Garwood | June 13, 1922 |
| 1,431,099 | Dann | Oct. 3, 1922 |
| 1,458,751 | Gailor | June 12, 1923 |
| 1,752,682 | McConnell | Apr. 1, 1930 |
| 1,935,950 | Lawrence | Nov. 21, 1933 |
| 2,044,684 | Haigh | June 16, 1936 |
| 2,127,485 | Owens et al. | Aug. 16, 1938 |
| 2,130,448 | Signori | Sept. 20, 1938 |
| 2,164,845 | Steed | July 4, 1939 |
| 2,197,183 | Keeler | Apr. 16, 1940 |
| 2,221,764 | Graham | Nov. 19, 1940 |
| 2,235,953 | Whitfield | Mar. 25, 1941 |
| 2,386,025 | Wills | Oct. 2, 1945 |
| 2,559,427 | Hastings | July 3, 1951 |
| 2,608,143 | Haupt | Aug. 26, 1952 |

FOREIGN PATENTS

| | | |
|---|---|---|
| 121,530 | Great Britain | Dec. 24, 1918 |

OTHER REFERENCES

Roads and Streets, Aug. 1943, p. 54.
Roads and Streets, Jan. 1944, pp. 16 and 17.